United States Patent
Lin et al.

(10) Patent No.: US 8,912,769 B2
(45) Date of Patent: Dec. 16, 2014

(54) CURRENT MODE BUCK-BOOST CONVERTER

(75) Inventors: Ming-Wei Lin, Hsinchu (TW); Robert Yung-His Tsu, Taichung (TW); Ching Long Lin, Taipei (TW); Ke-Horng Chen, Hsinchu (TW); Yu-Huei Lee, New Taipei (TW); Shih-Wei Wang, Hualien County (TW); Wei-Chan Wu, Changhua County (TW); Ping-Ching Huang, Taipei (TW)

(73) Assignee: Energy Pass, Inc., Hsinchu (TW)

( * ) Notice: Subject to any disclaimer, the term of this patent is extended or adjusted under 35 U.S.C. 154(b) by 381 days.

(21) Appl. No.: 13/354,427

(22) Filed: Jan. 20, 2012

(65) Prior Publication Data
US 2012/0274295 A1 Nov. 1, 2012

(30) Foreign Application Priority Data
Apr. 29, 2011 (TW) .............................. 100115253 A (51) Int. Cl.
*G05F 3/16* (2006.01)
*H02M 3/158* (2006.01)

(52) U.S. Cl.
CPC .................................. *H02M 3/1582* (2013.01)
USPC .......................................... 323/224; 323/259

(58) Field of Classification Search
USPC ......... 323/222, 225, 237, 259, 267, 282–299, 323/315; 363/16–20, 21.06, 49, 60, 65, 97
See application file for complete search history.

(56) References Cited

U.S. PATENT DOCUMENTS

| | | | |
|---|---|---|---|
| 4,611,310 A | 9/1986 | Durbin | |
| 5,329,222 A * | 7/1994 | Gyugyi et al. | 323/207 |
| 5,955,872 A * | 9/1999 | Grimm | 323/283 |
| 6,636,022 B2 * | 10/2003 | Sluijs | 323/222 |
| 7,199,563 B2 * | 4/2007 | Ikezawa | 323/266 |
| 7,495,423 B1 * | 2/2009 | Knight et al. | 323/284 |
| 7,821,238 B1 * | 10/2010 | Li | 323/224 |
| 7,956,586 B2 * | 6/2011 | Nagai et al. | 323/225 |
| 8,072,195 B2 * | 12/2011 | Aan De Stegge et al. | 323/224 |
| 8,085,005 B2 * | 12/2011 | Dearn | 323/222 |
| 8,269,472 B2 * | 9/2012 | Lin | 323/282 |
| 2006/0273768 A1 | 12/2006 | Chen et al. | |
| 2009/0108820 A1 | 4/2009 | Mirea | |

FOREIGN PATENT DOCUMENTS

| | | |
|---|---|---|
| CN | 101931326 A | 12/2010 |
| TW | I326980 | 7/2010 |
| TW | 201034363 A | 9/2010 |

OTHER PUBLICATIONS

China Patent Office, Office action issued on Mar. 26, 2014.

\* cited by examiner

*Primary Examiner* — Rajinkant Patel
(74) *Attorney, Agent, or Firm* — Li & Cai Intellectual Property (USA) Office (57) ABSTRACT

A current mode buck-boost converter has an input terminal, an output terminal, and an output capacitor coupled to the output terminal. The input terminal is used to receive an input voltage, and the output terminal is for producing the output voltage. The current mode buck-boost converter comprises a voltage converter and a control circuit. The voltage converter comprises an inductor. The control circuit is for detecting the current passing through the inductor to determine the electric energy transmitted to the output terminal by the voltage converter. Accordingly, the current mode buck-boost converter has fast response, and the electrical energy can be recycled and stored to the voltage source when the current mode buck-boost converter operates in down-tracking process.

17 Claims, 10 Drawing Sheets

CURRENT MODE BUCK-BOOST CONVERTER

BACKGROUND OF THE INVENTION

1. Field of the Invention

The present invention relates to a direct current (DC) converter; in particular, to a current mode buck-boost converter.

2. Description of Related Art

Figure 1:
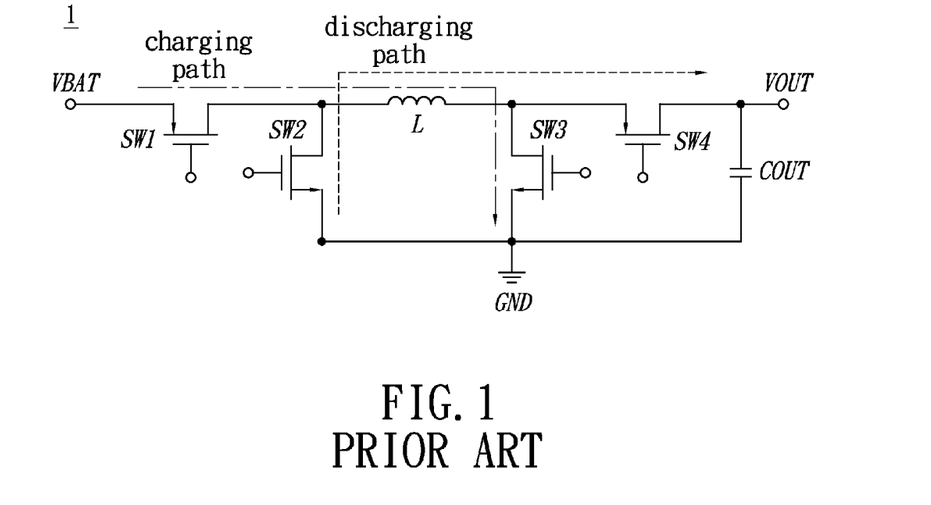
FIG. 1 shows a circuit diagram of a traditional H bridge converter.

The direct current converter is an important component for operation of electronic products. FIG. 1 shows a circuit diagram of a traditional H bridge converter. The H bridge converter is commonly used in existing buck-boost converters, and the H bridge converter comprises an inductor L and four switches SW1~SW4. The switch SW1 is coupled between the inductor L and the input voltage VBAT. The switch SW2 and the switch SW3 are coupled between two terminals of the inductor L and the grounding terminal GND. The switch SW4 is coupled between a terminal of the inductor L and the output terminal. The output terminal is coupled with an output capacitor COUT. The H bridge converter is a DC to DC converter for converting the input voltage VBAT to the output voltage VOUT. The mentioned switches SW1~SW4 can be embodied by power transistors and the input voltage VBAT can be provided by a battery.

Figure 2:
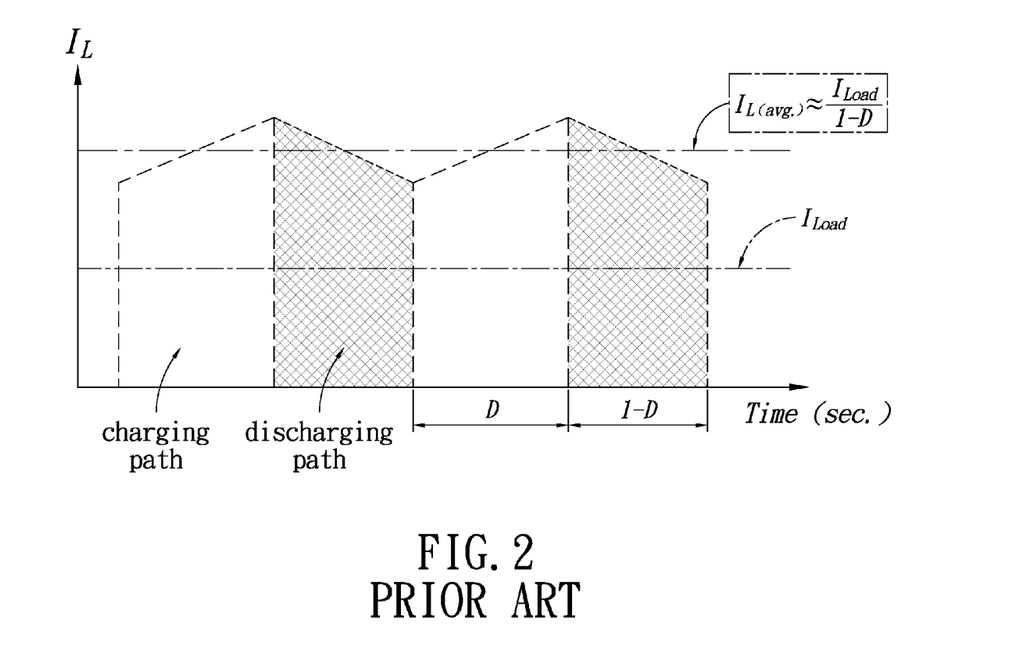
FIG. 2 shows a curve diagram of the current of an inductor of the traditional H bridge buck-boost converter.

The charging path and the discharging path are shown in FIG. 1. During the charging process, the charging path is composed of turned-on switches SW1, SW3 for charging the inductor L. During the discharging process, the discharging path is composed of turned-on switches SW2, SW4, and the electric energy stored in the inductor L would be transmitted to the output terminal to generate the output voltage VOUT. According to the inductor volt-second balance theorem, the relations between the average output current $I_{Load}$ and the current of the inductor $I_{L(avg.)}$ can be derived as $I_{L(avg.)}=I_{Load}/(1-D)$, wherein the D is the duty-cycle. When VBAT=VOUT, D is 50%, the current of the inductor $I_{L(avg.)}$ are twice of the output current $I_{Load}$. The waveform of the current $I_L$ of the inductor L is shown in FIG. 2.

As mentioned above, the H bridge converter switches (turns on or turns off) the four switches in each cycle, and the switch process would lead to power consumption. When the duty-cycle is 50%, the current of the inductor is twice of the current of the loading, such that the power consumption would be four times of the power consumption of a boost converter or a buck converter.

SUMMARY OF THE INVENTION

The object of the present invention is to provide a current mode buck-boost converter applying a current mode to obtain fast response. The current mode buck-boost converter applies peak current control and valley current control to control the buck mode operation and the boost mode operation. Besides, the invention applies pulse skipping technology to extend the charge time or the discharge time of the inductor, such that the current mode buck-boost converter switches between the buck mode and the boost mode smoothly. The present invention further provides a power-tracking path for fast adjusting the output voltage in order to fit in with the power requirement of the posterior system.

In order to achieve the aforementioned objects, according to an embodiment of the present invention, a current mode buck-boost converter having an input terminal, an output terminal, and an output capacitance coupled to the output terminal is offered. The input terminal is used to receive an input voltage, and the output terminal is used to generate an output voltage. The current mode buck-boost converter comprises a voltage converter and a control circuit. The voltage converter comprises an inductor, and the control circuit is for detecting a current passing through the inductor to determine an electrical energy transmitted to the output terminal by the voltage converter.

In order to achieve the aforementioned objects, according to an embodiment of the present invention, a direct current voltage converting method is offered. The direct current voltage converting method is adapted to convert an electrical energy of a voltage source and transmit the electrical energy to an output terminal by a voltage converter. The method comprises providing the voltage source coupled to the voltage converter, detecting a current passing through an inductor of the voltage converter, and determining a magnitude of the converted electrical energy transmitted to the output terminal by the voltage converter according to the detected current.

In summary, the current mode buck-boost converter and the direct current voltage converting method provided by the present invention have fast response, and the electric energy can be recycled when the current mode buck-boost converter operate in down-tracking process.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Figure 3:
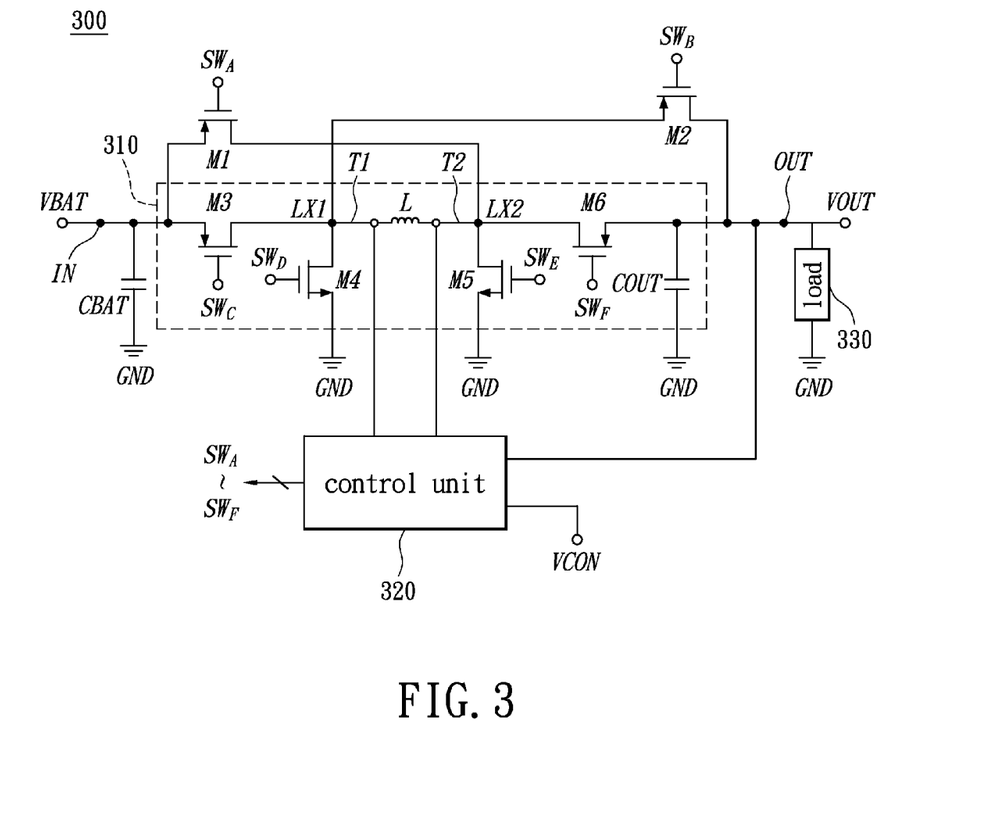
FIG. 3 shows a schematic diagram of a current mode buck-boost converter according to an embodiment of the present invention.

FIG. 3 shows a schematic diagram of a current mode buck-boost converter according to an embodiment of the present invention. The current mode buck-boost converter 300 is used to convert an input voltage VBAT to an output voltage VOUT for a load 330. The current mode buck-boost converter 300 comprises a voltage converter 310 and a control circuit. The circuit comprises switches M1, M2 and a control unit 320. The voltage converter 310 comprises switches M3~M6, an inductor L, and an output capacitor COUT.

An input terminal IN of the voltage converter 310 receives the input voltage VBAT, and is connected to an input capacitor CBAT. An output terminal OUT of the voltage converter 310 generates an output voltage VOUT. The switch M3 is coupled between the input terminal IN and a first terminal T1 of the inductor L. The switch M4 is coupled between the first terminal T1 of the inductor L and the grounding terminal GND. The switch M5 is coupled between a second terminal T2 of the inductor L and the grounding terminal GND. The switch M6 is coupled between the second terminal T2 and the output terminal OUT. The switch M1 is coupled between the input terminal IN and the second terminal T2 of the inductor L. The switch M2 is coupled between the first terminal T1 of the inductor and the output terminal OUT. The control unit 320 is coupled to the two terminals T1, T2 of the inductor, and outputs driving signals $SW_A$~$SW_F$ to switches M1~M6 for turning on or turning off switches M1~M6 according to the current passing through the inductor L, the output voltage VOUT, and a system controlling voltage VCON. The control unit 320 senses the current passing through the inductor L according to voltages LX1, LX2 of the two terminals T1, T2 of the inductor L, and adjusts the electrical energy of the output terminal OUT (output voltage VOUT).

It is worth mentioning that switches M1~M6 can be embodied by power transistors, and the system controlling voltage VCON is used to indicate a power requirement of the load 330 of the posterior system, for example, the switching between the standby mode and the operating mode. In the operating mode, the posterior system requests the current mode buck-boost converter 300 to raise the output voltage VOUT to an operating voltage. In the standby mode, the posterior system requests the current mode buck-boost converter 300 to reduce the output voltage VOUT to a standby voltage. In general, the operating voltage is higher than the input voltage VBAT, and the standby voltage is lower than the input voltage VBAT.

Figure 4A:
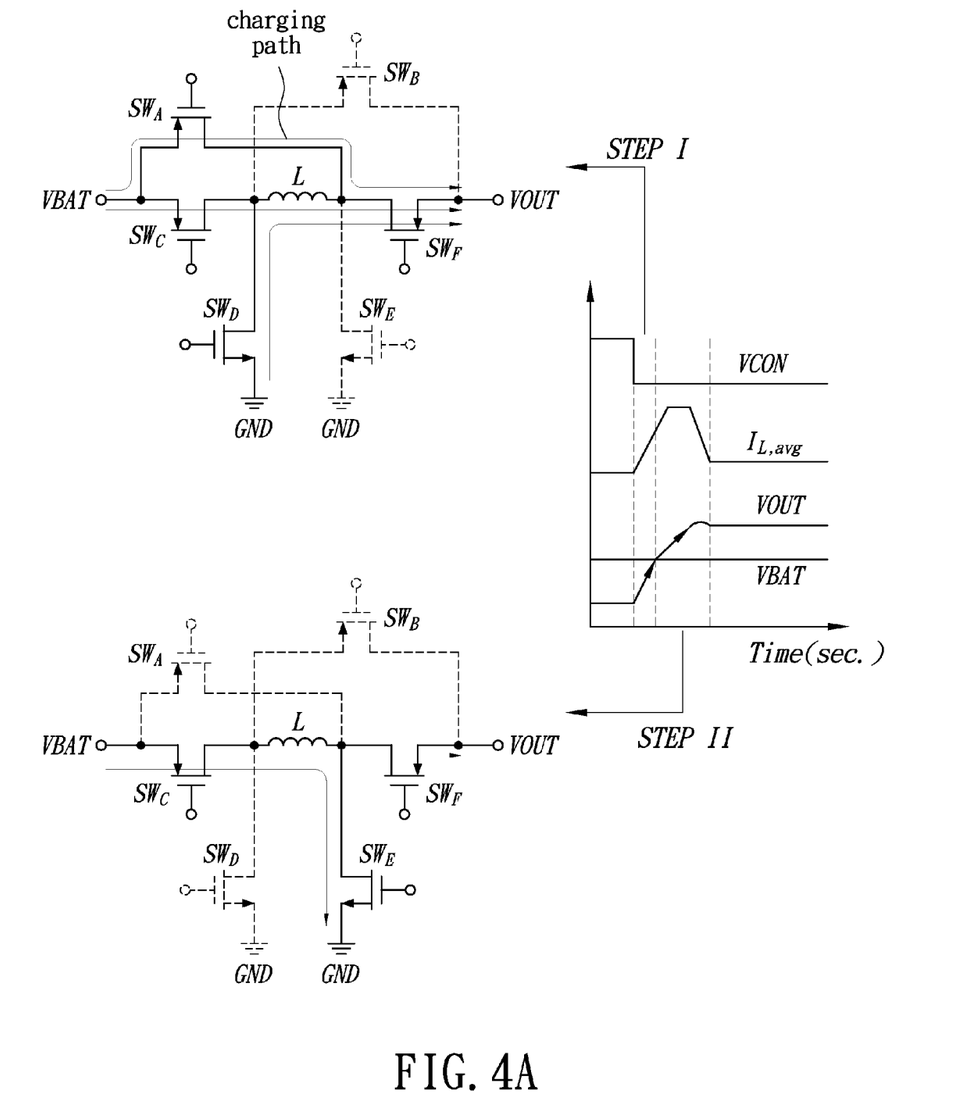
FIG. 4A shows a schematic diagram of a current mode buck-boost converter operating in up-tracking process according to an embodiment of the present invention.

When receiving a switch of the operation mode indicated by the system controlling voltage VCON, the control circuit provides a power-tracking path for fast adjusting the output voltage in order to fit in with the power requirement of the posterior system. For example, when the system controlling voltage VCON (e.g. changing from a high voltage to a low voltage) demands the current mode buck-boost converter to operate from the standby mode to the operating mode, that is demanding the output voltage VOUT to raise to the operating voltage from the standby voltage, the control circuit will execute a up-tracking process. For realizing a tracking speed for fast reference, a large current is needed to charge the output capacitor COUT. In the charging process, limitations of charging current and maximum current for avoiding inrush current and realizing a fast charging speed. FIG. 4A shows a schematic diagram of a current mode buck-boost converter operating in up-tracking process according to an embodiment of the present invention. The up-tracking process comprises steps as following: (step I) operating the voltage converter 310 in a buck mode and turning on switch M1, so as to directly charge the output capacitor COUT with the input voltage VBAT until the output voltage VOUT is higher than the input voltage; and, (step II) operating the voltage converter 300 in a boost mode and turning off switch M1, and the switch M2 for continue increasing the output voltage VOUT to the operating voltage when the output voltage VOUT is higher than the input voltage VBAT.

It is worth mentioning that in the buck mode, the control unit 320 turns on the switch M6, turns off the switch M5, and controls switches M3, M4 for operating the voltage converter 310 similarly to a buck circuit. Otherwise, in the boost mode, the control unit 320 turns on the switch M3, turns off the switch M4, and controls switches M5, M6 for operating the voltage converter 310 similarly to a boost circuit. Switches M1, M2 are turned on in correspondence with switch between the standby mode and the operating mode. Switches M1, M2 are in off state when the mode (the standby mode or the operating mode) is not changed. An artisan of ordinary skill in the art will appreciate how to realize the embodiment after reading the aforementioned illustrations.

Figure 4B:
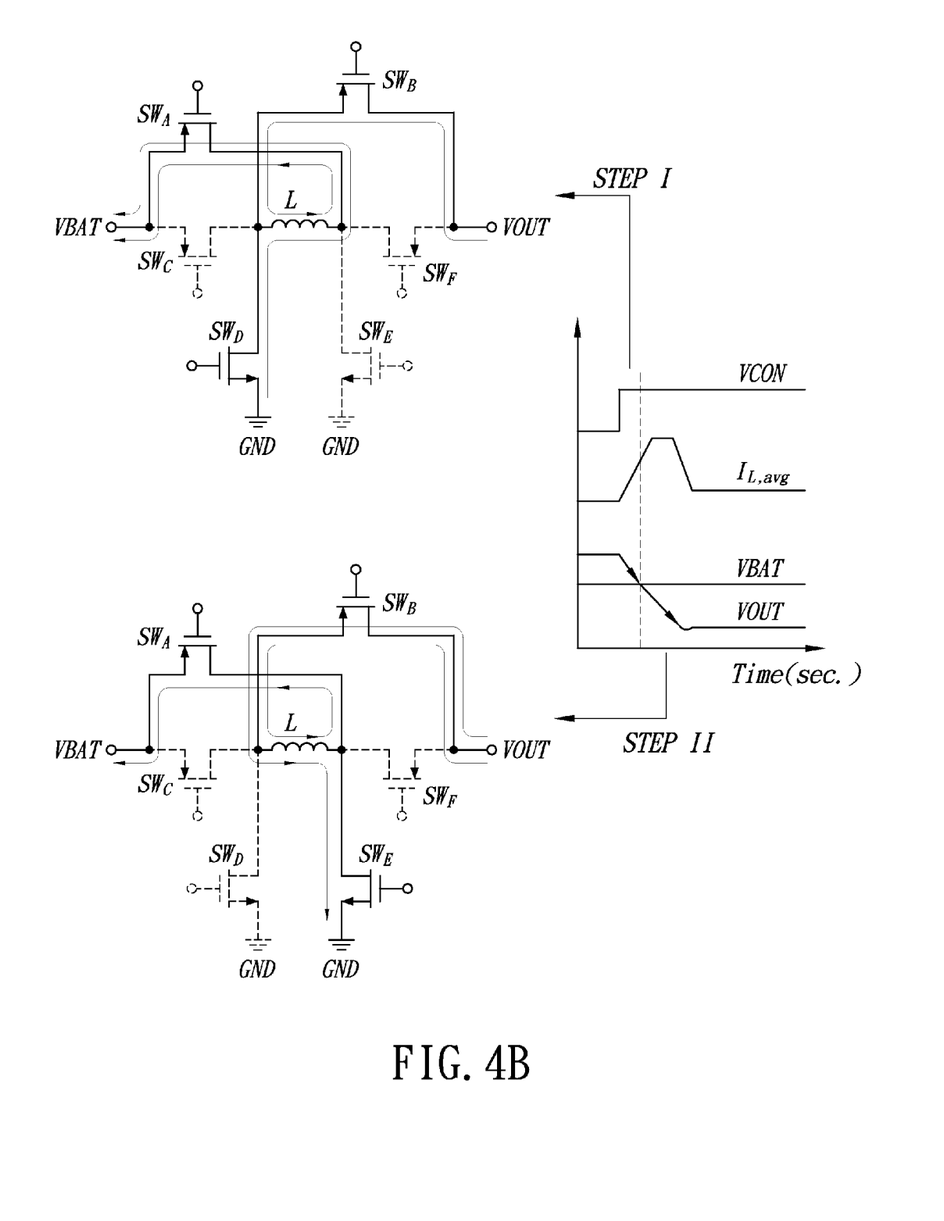
FIG. 4B shows a schematic diagram of a current mode buck-boost converter operating in down-tracking process according to an embodiment of the present invention.

When the system controlling voltage VCON (e.g. changing form a low voltage to a high voltage) demands the current mode buck-boost converter to operate from the operating mode to the standby mode, that is demanding the output voltage VOUT to reduce to the standby voltage, the control circuit would execute a down-tracking process for rapidly reducing the output voltage VOUT to the standby voltage. FIG. 4B shows a schematic diagram of a current mode buck-boost converter operating in the down-tracking process according to an embodiment of the present invention. The down-tracking process comprises the following steps: (step I) turning on the switch M1 and the switch M2 for transmitting the electrical energy stored in the output capacitor COUT to the input terminal IN and controlling the switch M4, so that the inductor L is discharged into the input terminal IN until the output voltage VOUT is lower than the input voltage VBAT; and (step II) controlling the switch M5 to charge the inductor L with the output voltage VOUT and transmit the electrical energy to the output terminal OUT until the output voltage VOUT reaches to the standby voltage when the output voltage VOUT is lower than the input voltage VBAT.

In step I, switches M3, M6 are turned off, switches M1, M2 are always turned on, and the switch M4 determines the charging or discharging current to provide the maximum discharging current from the output capacitor COUT to the input terminal IN. In other words, at the point of view from the output terminal OUT to the voltage converter 310, the operation is similarly to a buck circuit. In step II, at the point of view from the output terminal OUT to the voltage converter 310, the operation is similarly to a boost circuit, and the switch M5 determines the charging or discharging current of the inductor L until the output voltage VOUT approaches to the target value for realizing the fast down-tracking. Besides, switches M1, M2 are not only used to reduce the transit response time but also used to recycle the surplus energy to the input terminal in the down-tracking process. If the voltage source to which the input terminal IN is coupled is a secondary battery, the recycled electrical energy can be used to charge the secondary battery directly.

Figure 5:
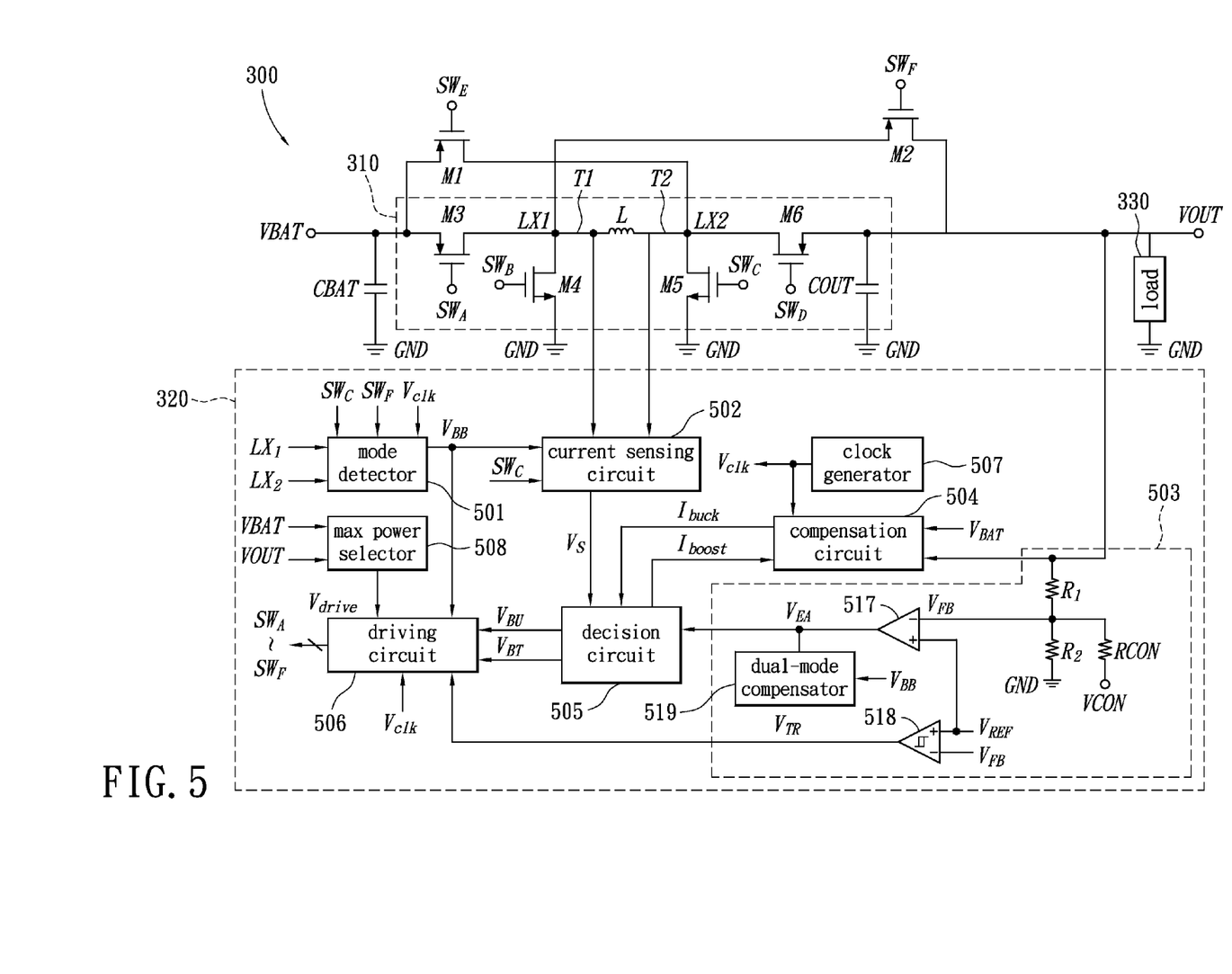
FIG. 5 shows a circuit diagram of a current mode buck-boost converter according to an embodiment of the present invention.

As mentioned above, the current mode buck-boost converter 300 of the embodiment can fast adjust the output voltage 300 when the operation of loading is changed. The circuit operation of the embodiment in transient state is described as follows. The embodiment uses current control mode to obtain fast transient response, and because of the current control mode, the output pins can be reduced by using embedded system compensation. FIG. 5 shows a circuit diagram of a current mode buck-boost converter according to an embodiment of the present invention. The control unit 320 detects the current passing through the inductor L to generate a current signal Vs and to add the current signal Vs with the ramp compensation signal (boost compensating current $I_{boost}$ and buck compensating current $I_{buck}$) for obtaining the summing signal (not shown in the figure). The summing signal is compared with the feedback signal $V_{EA}$ generated by a first feedback amplifier 517 to generate a first controlling signal $V_{BU}$ corresponding to the buck mode and a second controlling signal $V_{BT}$ corresponding to the boost mode. Then, the control unit 320 adjusts duty-cycles of driving signals $SW_A\sim SW_F$ to determine the charging time and the discharging time during one period according to the first controlling signal $V_{BU}$ and the second controlling signal $V_{BT}$.

When the input voltage VBAT is much higher than the output voltage VOUT, the current mode buck-boost converter 300 is operating in the boost mode. At the same time, the control unit 320 controls switches M5, M6 according to the comparison result of a valley value of the summing signal and the feedback signal $V_{EA}$ (at the same time, the switch M3 is turned on, and the switch M4 is turned off). When the input voltage VBAT is much lower than the output voltage VOUT, the current mode buck-boost converter 300 is operating in the buck mode. At the same time, the control unit 320 controls duty-cycles of switches M3, M4 according to the comparison result of a peak value of the summing signal and the feedback signal $V_{EA}$ (at the same time, the switch M6 is turned on, and the switch M5 is turned off).

When the input voltage VBAT is close to the output voltage VOUT, the control unit 320 would have the transition between the boost mode and the buck mode change smoothly by using pulse skipping technology. In the boost mode, the control unit 320 extends the discharging time of the inductor L for having the operation of the voltage converter 310 switch from the boost mode to the buck mode smoothly. In the buck mode, the control unit 320 extends the charging time of the inductor L for having the operation of the voltage converter 310 switch from the buck mode to the boost mode smoothly. Increase of the discharging time and the charging time may be determined by pulses. For example, extending several predetermined cycles for smooth transition between the boost mode and the buck mode. The mentioned operation method may avoid difficulties of determining the maximum duty-cycle and the minimum duty-cycle due to noise factor of switches and the propagation delay. As such, it may be avoided that the duty-cycle could not be 100% and 0% in the buck mode and the boost mode respectively.

Please refer to FIG. 5; details of the control unit 320 are described as follows. The control unit 320 comprises a mode detector 501, a current sensing circuit 502, a feedback circuit 503, a compensation circuit 504, a decision circuit 505, a driving circuit 506, and a clock generator 507. The control unit 320 is used to control switches M1~M6, and the control unit 320 determines the operation mode (boost mode or buck mode) of the voltage converter 310 according to the voltages LX1, LX2 of two terminals T1, T2 of the inductor L. The control unit 320 adjusts the first controlling signal $V_{BU}$ corresponding to the buck mode and the second controlling signal $V_{BT}$ corresponding to the boost mode according to the operation mode of the voltage converter 310 and the output voltage VOUT. The control unit 320 controls switches M3, M4 according to the first controlling signal $V_{BU}$. The control unit 320 controls switches M5, M6 according to the second controlling signal $V_{BT}$. It should be noticed that the control unit 320 of the embodiment is for describing the present invention, and the present invention is not restricted thereto.

Figure 6:
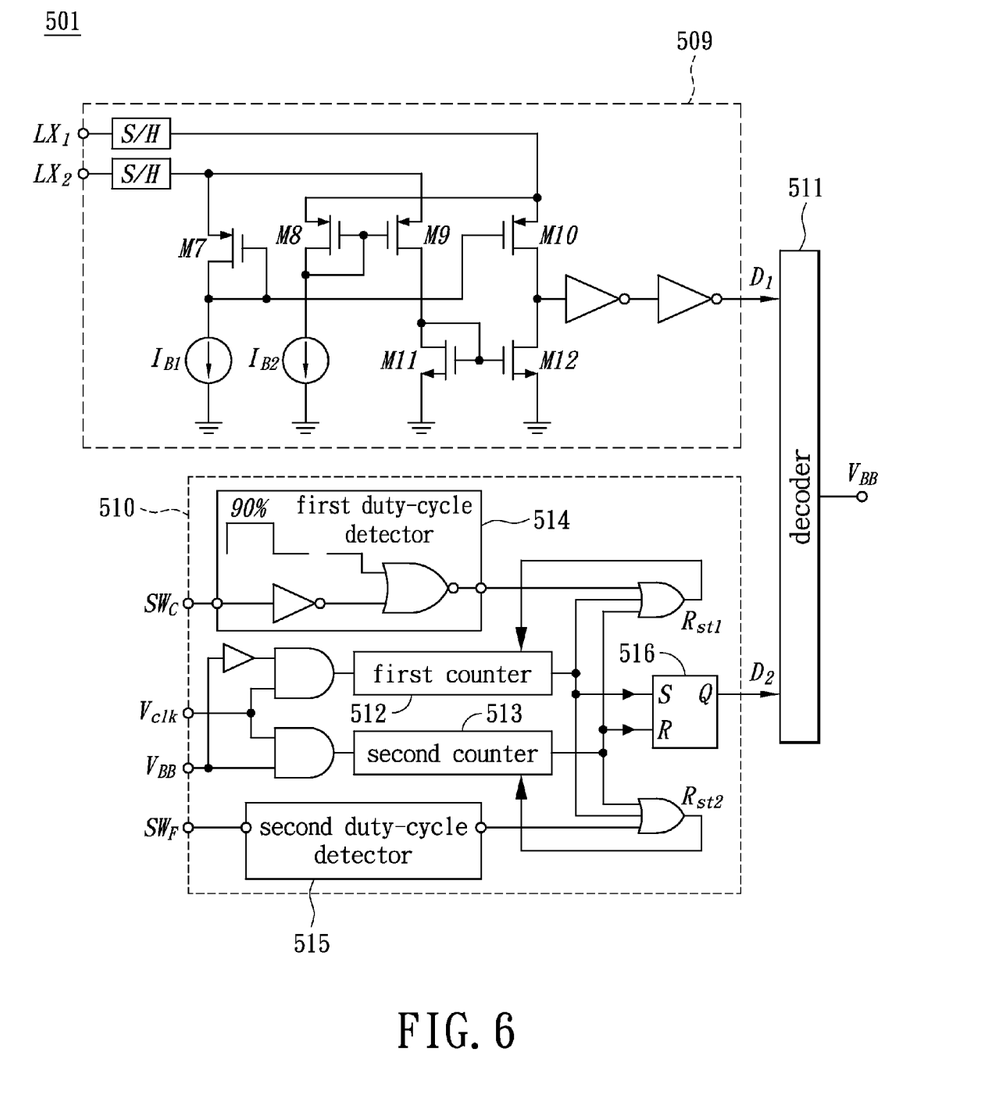
FIG. 6 shows a circuit diagram of a mode detector according to an embodiment of the present invention.

Please refer to FIG. 5 again; the mode detector 501 generates a mode signal $V_{BB}$ according to voltages LX1, LX2 of two terminals T1, T2 of the inductor L for indicating whether the current mode buck-boost converter operates in the boost mode or the buck mode. FIG. 6 shows a circuit diagram of a mode detector according to an embodiment of the present invention. The mode detector 501 comprises a master control circuit 509, a slave control circuit 510, and a decoder 511. The mode detector 501 generates the mode signal $V_{BB}$ according to the mode signal $V_{BB}$, the control signal $SW_C$, and the control signal $SW_F$. Accordingly, the mode detector 501 determines whether the current mode buck-boost converter 300 operates in the buck mode or the boost mode. When the input voltage VBAT and the output voltage VOUT have significant changes, the master control circuit 509 compares voltages LX1, LX2 of two terminals T1, T2 of the inductor for a primary judgment mechanism. When the voltage LX1 is much higher than the voltage LX2, the current mode buck-boost converter 300 operates in the buck mode. On the contrary, when the voltage LX1 is much lower than the voltage LX2, the current mode buck-boost converter 300 operates in the boost mode. The master control circuit 509 compares the voltage LX1 and the voltage LX2 only when switches M3, M6 are turned on, and the architecture of the circuit is push-pull type for output. When the voltage LX1 is higher than the voltage LX2, the output logic D1 is at high voltage level (High). On the contrary, when the voltage LX1 is lower than the voltage LX2, the output logic D1 is at low voltage level (Low).

Please refer to FIG. 6 again; when the input voltage VBAT is close to the output voltage VOUT, the slave control circuit 501 adapts pulse skipping for a secondary judgment mechanism. The slave control circuit 510 comprises several logic gates, a first counter 512, a second counter 513, a first duty-cycle detector 514, a second duty-cycle detector 515, and a latch 516. In the buck mode, the first duty-cycle detector 514 detects whether the duty-cycle is larger than a first predetermined value (e.g. 90%). If the duty-cycle is larger than the first predetermined value, the first counter 512 would count how many pulses of a clock Clk are happened. When the counted number of pulses of the clock Clk reaches to a predetermined number (e.g. the predetermined number is 5), the first counter 512 generates a triggering signal to the latch 516. Accordingly, the current mode buck-boost converter 300 switches to the boost mode according to the mode signal $V_{BB}$ outputted by the decoder 511.

Likewise, in the boost mode, the second duty-cycle detector 515 detects whether the duty-cycle is less than a second predetermined value (e.g. 10%). If the duty-cycle is less than the second predetermined value, the second counter 513 would count how many pulses of the clock Clk are happened. When the counted number of pulses of the clock Clk reaches to the predetermined number (e.g. the predetermined number is 5), the second counter 513 generates a triggering signal to the latch 516. Accordingly, the current mode buck-boost converter 300 switches to the buck mode according to the mode signal $V_{BB}$ outputted by the decoder 511.

In other words, when the current mode buck-boost converter 300 operates in the buck mode and the duty-cycle of the first controlling signal $V_{BU}$ is larger than the first predetermined value, the control unit 320 extends the turn-on time of the switch M3 to extend a charging time of the inductor L, and then the voltage converter 310 is switched from the buck mode to the boost mode. When the current mode buck-boost converter 300 operates in the boost mode and the second controlling signal $V_{BT}$ is less than the second predetermined value, the control unit 320 extends the turn-off time of the switch M5 to extend a discharging time of the inductor L, and the voltage converter 310 is switched from the boost mode to the buck mode.

The characteristic of using pulse skipping to determine switch of the operation mode is that the original operation mode changes only when the counted number of the skipped pluses reaches to the predetermined number, on the condition that the voltage source VBAT is close to the output voltage VOUT. As such, reduction of switching times increases the power conversion efficiency, and the probability of erroneous judgment can be reduced too.

Please refer to FIG. 5; the current sensing circuit 502 is used to detect voltages LX1, LX2 of two terminals T1, T2 of the inductor L, and the current sensing circuit 502 outputs a current signal Vs to the decision circuit 505 according to the different of voltages LX1, LX2. The current signal Vs indicates the current passing through the inductor L, such that the current signal Vs is proportional to voltage difference of two terminals T1, T2 of the inductor (difference of LX1 and LX2). When the voltage converter 310 operates in the buck mode, the decision circuit 505 adjusts the buck duty-cycle of the first controlling signal $V_{BU}$ according to the peak value of the summing signal (summation of the current signal Vs and the ramp compensating signal). When the voltage converter operates in the boost mode, the decision circuit 505 adjusts the boost duty-cycle of the second controlling signal $V_{BT}$ according to the valley value of the summing signal.

Please refer to FIG. 5 again; the feedback circuit 503 is used to feedback the output voltage VOUT to generate the feedback signal $V_{EA}$ and the triggering signal $V_{TR}$. The feedback signal 503 comprises resistors R1, R2, a control resistor RCON, a first feedback amplifier 517, a second feedback amplifier 518, and a dual-mode compensator 519. A first terminal of the resistor R1 is coupled to the output terminal OUT. A first terminal of the resistor R2 is coupled to a second terminal of the resistor R1. A second terminal of the resistor R2 is coupled to a grounding terminal GND. A first terminal of the control resistor RCON is coupled to the second terminal of the resistor R1 and the first terminal of the resistor R2. A second terminal of the control resistor RCON is coupled to a system controlling voltage VCON from an exterior system (not shown in the figure). The system controlling voltage VCON controls the divided voltage $V_{FB}$ of the resistor R1 and the resistor R2 through the control resistor RCON.

The first feedback amplifier 517 and the second feedback amplifier 518 receive the divided voltage $V_{FB}$ and a predetermined reference voltage $V_{REF}$, and output the feedback signal $V_{EA}$ and the triggering signal $V_{TR}$ separately. The first feedback amplifier 517 transmits the feedback signal $V_{EA}$ to the decision circuit 505, and the second feedback amplifier 518 transmits the triggering signal $V_{TR}$ to the driving circuit 506.

Besides, the dual-mode compensator 519 is used based on different demands of the current mode buck-boost converter in applications. The dual-mode compensator 519 adjusts the feedback signal $V_{EA}$ from the first feedback amplifier 517 to modify the closed-loop bandwidth of the current mode buck-boost converter 300 for ensuring that the current mode buck-boost converter 300 can operate in a wider bandwidth.

Figure 7:
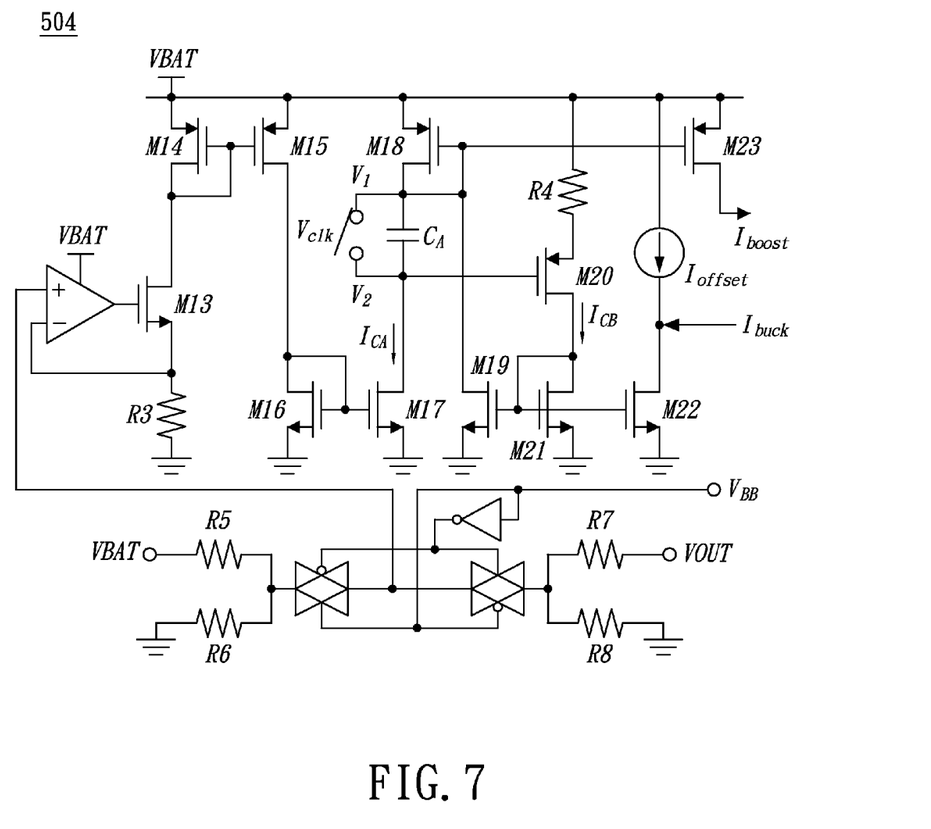
FIG. 7 shows a circuit diagram of a compensation circuit according to an embodiment of the present invention.

The compensation circuit 504 generates and outputs a buck compensating signal $I_{buck}$ and a boost compensating signal $I_{boost}$ to the decision circuit 505 according to the input voltage VBAT and the output voltage VOUT. The buck compensating signal $I_{buck}$ and the boost compensating signal $I_{boost}$ are the basis for the decision circuit 505 to determine the first controlling signal $V_{BU}$ and the second controlling signal $V_{BT}$. Therefore, the duty-cycle of the current mode buck-boost converter 300 can be determined. The compensation circuit 504 can be embodied by using the circuit shown in FIG. 7. FIG. 7 shows a circuit diagram of a compensation circuit according to an embodiment of the present invention. The compensation circuit 507 composes transistors M13~M22, several amplifiers, resistors R4~R8, a capacitor $C_A$, and two transmission gates.

Figure 8:
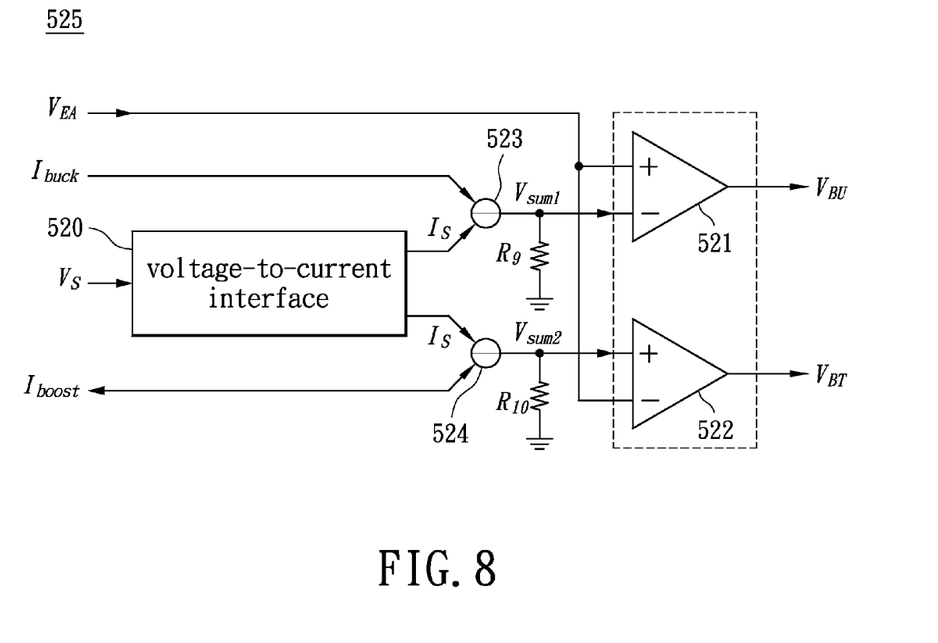
FIG. 8 shows a circuit diagram of a decision circuit according to an embodiment of the present invention.

Please refer to FIG. 5 again; the decision circuit 505 generates and transmits the first controlling signal $V_{BU}$ and the second controlling signal $V_{BT}$ to the driving circuit 506 according to the current signal Vs, the buck compensating signal $I_{buck}$ and the boost compensating signal $I_{boost}$. An embodiment of the decision circuit is shown in FIG. 8. FIG. 8 shows a circuit diagram of a decision circuit according to an embodiment of the present invention. The decision circuit 505 comprises a voltage-to-current interface 520, a first comparator 521, a second comparator 522, adders 523, 524, and resistors R9, R10.

Figure 9A:
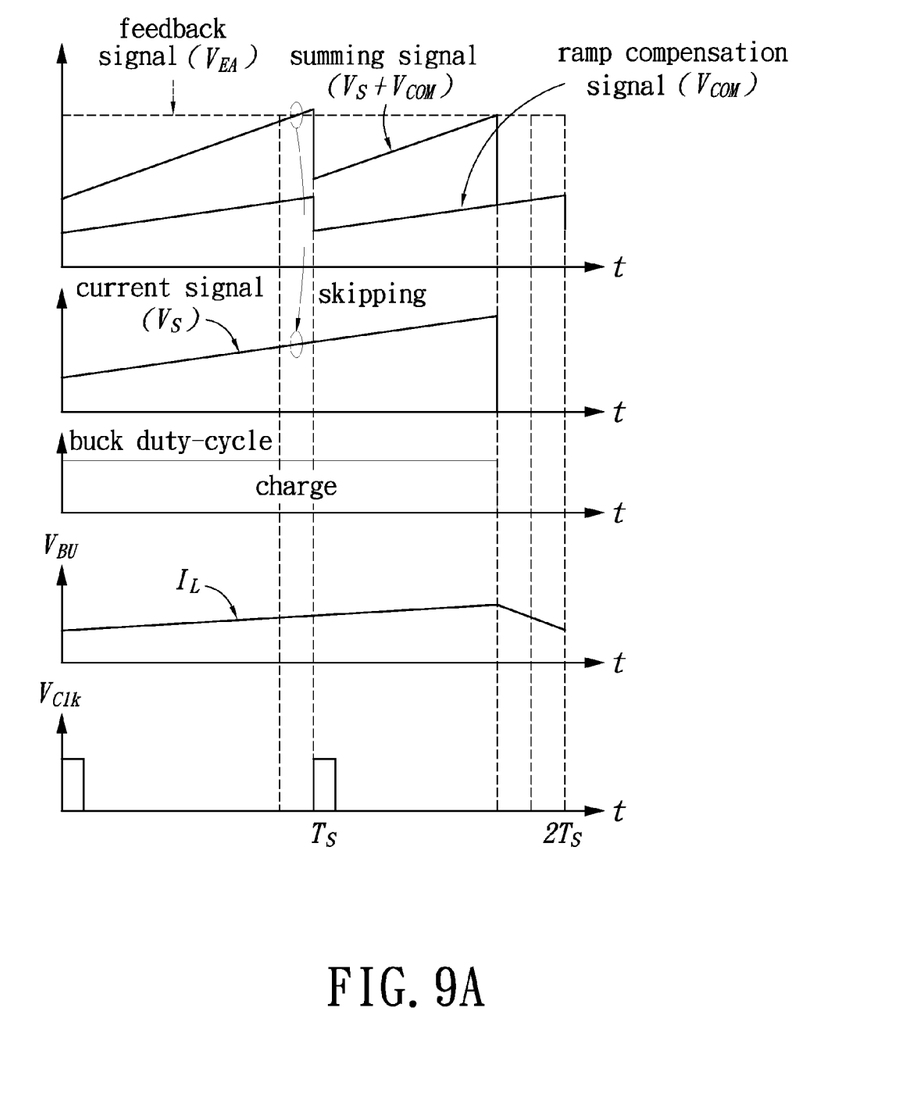
FIG. 9A shows a curve diagram of a current mode buck-boost converter operating applying peak current control in buck mode according to an embodiment of the present invention.

Please refer to FIG. 8 and FIG. 9A, FIG. 9A shows a curve diagram of a current mode buck-boost converter operating applying peak current control in buck mode according to an embodiment of the present invention. The ramp compensation signal $V_{COM}$ and the current sensing signal Vs are added to be a summing signal ($V_{sum1}$), and the summing signal is obtained by the architecture composed of the voltage-to-current interface 520, the adder 523, and the first comparator 521. The ramp compensation signal $V_{COM}$ represents a form of voltage of the buck compensating signal $I_{buck}$ shown in FIG. 8. The first comparator 521 compares the summing signal and the feedback signal $V_{EA}$. When a pulse of the clock Clk happens, if the summing signal is higher than the feedback signal $V_{EA}$, the pulse would be skipped. In other words, the original state of the first controlling signal $V_{BU}$ would be extended because of the skipping of a pulse.

Figure 9B:
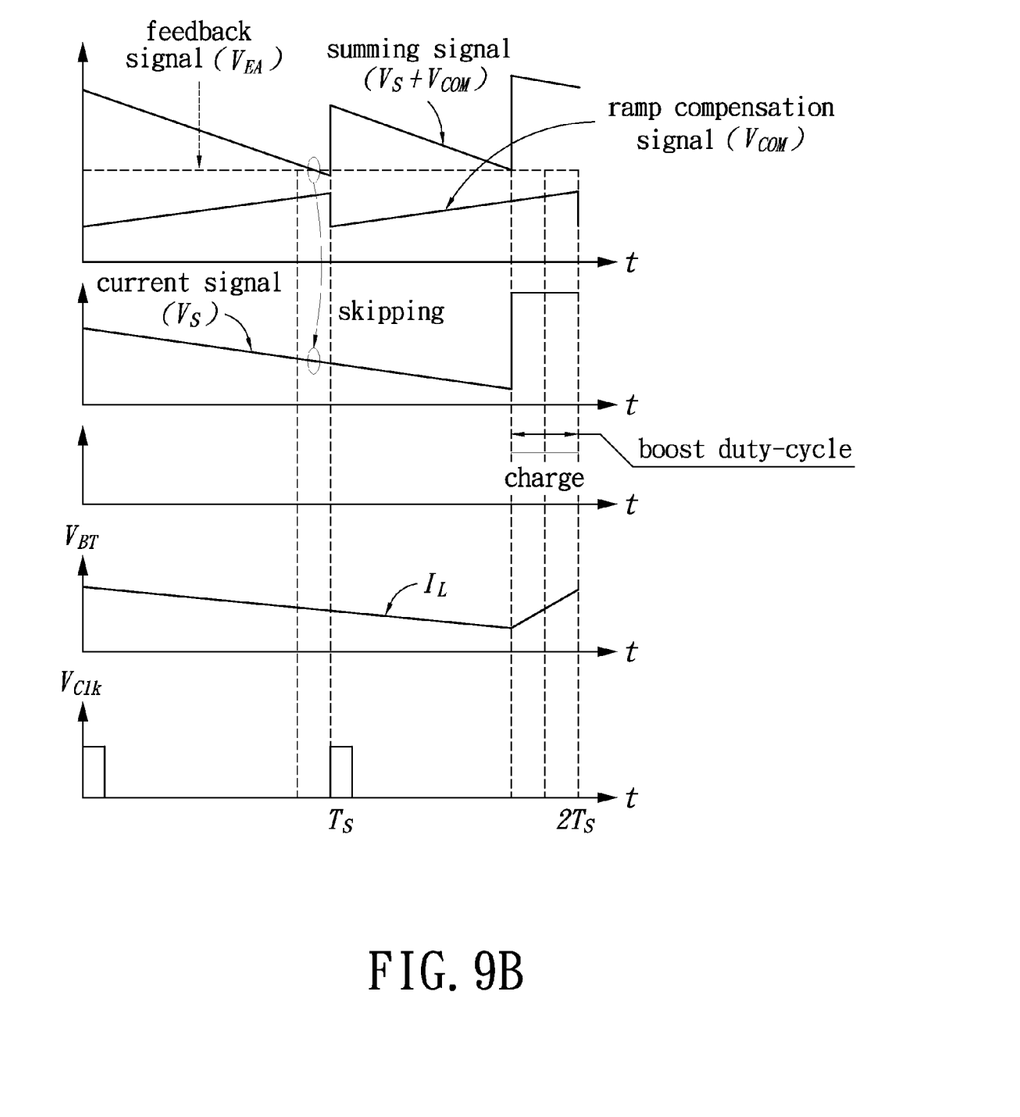
FIG. 9B shows a curve diagram of a current mode buck-boost converter operating applying valley current control in boost mode according to an embodiment of the present invention.

Please refer to FIG. 8 and FIG. 9B, FIG. 9B shows a curve diagram of a current mode buck-boost converter operating applying valley current control in boost mode according to an embodiment of the present invention. The ramp compensation signal $V_{COM}$ and the current sensing signal Vs are added to be the summing signal ($V_{sum2}$), and the summing signal is obtained by the architecture composed of the voltage-to-current interface 520, the adder 524, and the second comparator 522. The ramp compensation signal $V_{COM}$ represents a form of voltage of the buck compensating signal $I_{buck}$ shown in FIG. 8. The second comparator 522 compares the summing signal and the feedback signal $V_{EA}$. When a pulse of the clock Clk happens, if the summing signal is less than the feedback signal $V_{EA}$, the pulse would be skipped for decreasing the boost duty-cycle. In other words, the original state of the second controlling signal $V_{BT}$ would be extended because of the skipping of a pulse.

The driving circuit 506 make the current mode buck-boost converter 300 operate in the boost mode or the buck mode according to the modes signal $V_{BB}$, the first controlling signal $V_{BU}$, the second controlling signal $V_{BT}$, and the triggering signal $V_{TR}$. The driving circuit 506 outputs control signals $SW_A \sim SW_F$ to gates of switches M1~M6. It should be noticed that the buck mode has a corresponding buck duty-cycle according to the first controlling signal $V_{BU}$. The boost mode has a corresponding boost duty-cycle according to the second controlling signal $V_{BT}$.

The clock generator 507 is used to generate the clock Clk and transmits the clock Clk to the mode detector 501, the compensation circuit 504, and the driving circuit 506. In this embodiment, frequency of the clock Clk is 5 MHz.

Besides, the control unit 320 may further comprise a maximal power selecting circuit 508 coupled to the driving circuit 506. The maximal power selecting circuit 508 selects the larger power between the input voltage VBAT and the output voltage VOUT to power the driving circuit 506. As shown in FIG. 5, the maximal power selecting circuit 508 outputs a driving voltage $V_{drive}$ for supplying electrical energy to the driving circuit 506.

In summary, the mentioned current mode buck-boost converter uses current mode to obtain fast transient response. The current mode can use embedded system compensation to reduce output pins. The current mode buck-boost converter uses peak value current control and valley value current control for the buck mode and the boost mode respectively. Besides, pulse skipping technology is used to extend the effective duty-cycle, such that the traditional way of defining a buck-boost interval for buck-boost mode is needless. The output voltage can be adjusted fast for the power requirement of the posterior system. In the fast down-tracking process, the surplus energy can be recycled to the voltage source. Finally, in the steady state, the current mode buck-boost converter operates in the buck mode or the boost mode in the same cycle.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims

What is claimed is:

1. A current mode buck-boost converter, having an input terminal, an output terminal and an output capacitor coupled to the output terminal, the input terminal being used to receive an input voltage, the output terminal being used to generate an output voltage, the current mode buck-boost converter comprising:
    a voltage converter comprising an inductor; and
    a control circuit for detecting a current passing through the inductor to determine an electrical energy transmitted to the output terminal by the voltage converter, the control circuit comprising:
        a first switch coupled to the input terminal and a second terminal of the inductor; and
        a second switch coupled to the output terminal and a first terminal of the inductor;
    wherein the control circuit controls the first switch and the second switch according to a system controlling voltage to raise the output voltage from a standby voltage to an operating voltage or reduce the output voltage from the operating voltage to the standby voltage, wherein the standby voltage is lower than the input voltage, and the operating voltage is higher than the input voltage, and the system controlling voltage is used to indicate a load power requirement.

2. The current mode buck-boost converter according to claim 1, wherein when the output voltage is changed from the standby voltage to the operating voltage, the control circuit executes a up-tracking process, the up-tracking process comprising:
    operating the voltage converter in a buck mode and turning on the first switch so as to directly charge the output capacitor with the input voltage until the output voltage is higher than the input voltage; and
    operating the voltage converter in a boost mode and turning off the first switch and the second switch for increasing the output voltage to the operating voltage when the output voltage is higher than the input voltage.

3. The current mode buck-boost converter according to claim 1, wherein the control circuit further comprises:
    a third switch coupled between the first terminal of the inductor and a grounding terminal; and
    a fourth switch coupled between the second terminal of the inductor and the grounding terminal;
    wherein when the output voltage decreases from the operating voltage to the standby voltage, the control circuit executes a down-tracking process, the down-tracking process comprising:
        turning on the first switch and the second switch for transmitting an electrical energy stored in the output capacitor to the input terminal and controlling the third switch so that an electrical energy stored in the inductor is discharged into the input terminal until the output voltage is lower than the input voltage; and
        controlling the fourth switch so that the inductor is charged with the output voltage and the electrical energy is transmitted to the output terminal until the output voltage reaching the standby voltage when the output voltage is lower than the input voltage.

4. The current mode buck-boost converter according to claim 1, wherein the voltage converter comprises:
    a third switch coupled between the input terminal and the first terminal of the inductor;
    a fourth switch coupled between the first terminal of the inductor and a grounding terminal;
    a fifth switch coupled between the second terminal of the inductor and the grounding terminal; and
    a sixth switch coupled between the second terminal of the inductor and the output terminal.

5. The current mode buck-boost converter according to claim 4, wherein the control circuit further comprises:
    a control unit for controlling the first switch, the second switch, the third switch, the fourth switch, the fifth switch and the sixth switch, wherein the control unit determines whether the voltage converter operates in a boost mode or a buck mode according to the voltage across the two terminals of the inductor, the control unit adjusts a first controlling signal corresponding to the buck mode and a second controlling signal corresponding to the boost mode according to the operation mode of the voltage converter and the output voltage.

6. The current mode buck-boost converter according to claim 5, wherein the control unit controls the third switch and the fourth switch according to the first controlling signal, and controls the fifth switch and the sixth switch according to the second controlling signal.

7. The current mode buck-boost converter according to claim 5, wherein the control unit detects the current passing through the inductor to generate a current signal according to the voltage across two terminals of the inductor, and the control unit generates a summing signal according to the current signal and a ramp compensation signal,
    wherein when the voltage converter operates in the buck mode, the control unit adjusts the duty-cycle of the first controlling signal according to a peak value of the summing signal; when the voltage converter operates in the boost mode, the control unit adjusts the duty-cycle of the second controlling signal according to a valley value of the summing signal.

8. The current mode buck-boost converter according to claim 6, wherein when the current mode buck-boost converter operates in the buck mode and a duty-cycle of the first controlling signal is larger than a first predetermined value, the control unit extends the turn-ontime of the third switch to extend a charging time of the inductor, and the voltage converter is switched from the buck mode to the boost mode;

when the current mode buck-boost converter operates in the boost mode and a duty-cycle of the second controlling signal is less than a second predetermined value, the control unit extends the turn-off time of the fifth switch to extend a discharging time of the inductor, and the voltage converter is switched from the boost mode to the buck mode.

9. The current mode buck-boost converter according to claim 5, wherein the control unit comprises:
   a mode detector for generating a mode signal to indicate whether the current mode buck-boost converter operates in the boost mode or the buck mode according to voltages of the two terminals of the inductor;
   a current sensing circuit coupled to the two terminals of the inductor and the mode detector for generating a current signal corresponding to the current passing through the inductor;
   a feedback circuit coupled to the output terminal for generating a feedback signal according to the output voltage and a system controlling voltage, wherein the system controlling voltage is used to indicate a load power requirement;
   a compensation circuit for generating a boost compensating current and a buck compensating current;
   a decision circuit for generating a summing signal according to the current signal, the boost compensating current, and the buck compensating current, and generating the first controlling signal and the second controlling signal according to the summing signal and the feedback signal; and
   a driving circuit for controlling the first switch, the second switch, the third switch, the fourth switch, the fifth switch and the sixth switch according to the first controlling signal, the second controlling signal, the mode signal, and the feedback signal.

10. The current mode buck-boost converter according to claim 9, wherein the control unit further comprises:
    a maximal power selector coupled to the driving circuit for selecting a larger power between the input voltage and the output voltage for powering the driving circuit.

11. The current mode buck-boost converter according to claim 9, wherein the mode detector generates the mode signal according to the mode signal, the voltage at the control terminal of the third switch, the voltage at the control terminal of the sixth switch, and the mode detector determines whether the current buck-boost converter operates in the buck mode or the boost mode according to the mode signal.

12. The current mode buck-boost converter according to claim 9, wherein the feedback circuit comprises:
    a first resistor having a first terminal coupled to the output terminal;
    a second resistor having a first terminal coupled to a second terminal of the first resistor and having a second terminal coupled to the grounding terminal; and
    a control resistor having a first terminal coupled to a second terminal of the first resistor and the first terminal of the second resistor, and having a second terminal for receiving the system controlling voltage;
    a first feedback amplifier for receiving a divided voltage between the first resistor and the second resistor and a reference voltage, and outputting the feedback signal to the decision circuit; and
    a second feedback amplifier for receiving the divided voltage between the first resistor and the second resistor and receiving the reference voltage, and outputting the feedback signal to the driving circuit.

13. The current mode buck-boost converter according to claim 12, wherein the feedback circuit further comprises:
    a dual-mode compensator for adjusting the feedback signal from the first feedback amplifier to modify a closed-loop bandwidth of the current mode buck-boost converter.

14. The current mode buck-boost converter according to claim 9, wherein the control unit further comprises:
    a clock generator for generating an operation clock transmitted to the mode detector, the driving circuit, the current sensing circuit, and the compensation circuit.

15. A direct current voltage converting method, adapted to convert an electrical energy of a voltage source and transmit the electrical energy to an output terminal by a voltage converter, the method comprising:
    providing the voltage source coupled to the voltage converter;
    detecting a current passing through an inductor of the voltage converter; and
    determining a magnitude of the converted electrical energy transmitted to the output terminal by the voltage converter according to the detected current, wherein the step comprises:
    increasing the voltage at the output terminal from the standby voltage to the operating voltage or reducing the voltage at the output terminal from the operating voltage to the standby voltage according to a control voltage, wherein the control voltage indicates the load power requirement.

16. The direct current voltage converting method according to claim 15, wherein the step of increasing the voltage at the output terminal from the standby voltage to the operating voltage comprises:
    operating the voltage converter in a buck mode so as to directly charge a capacitor coupled to the output terminal with an input voltage until an output voltage is higher than an input voltage; and
    operating the voltage converter in a boost mode and to continue increasing the output voltage to the operating voltage when the output voltage is higher than the input voltage.

17. The direct current voltage converting method according to claim 15, wherein the step of reducing the voltage at the output terminal from the operating voltage to the standby voltage comprises:
    transmitting an electrical energy stored in the output capacitor to an input terminal so as to make an electrical energy stored in the inductor be discharged into the input terminal until the output voltage reaching the standby voltage; and
    charging the inductor with the output voltage and transmitting the electrical energy to the output terminal so as to make the output voltage reaching the standby voltage when the output voltage is lower than the input voltage.

* * * * *